(12) United States Patent
Robbins

(10) Patent No.: US 8,585,264 B2
(45) Date of Patent: Nov. 19, 2013

(54) ILLUMINATED MONOLITHIC CUP HOLDER ASSEMBLY AND METHOD

(75) Inventor: Brent H. Robbins, Cookeville, TN (US)

(73) Assignee: Federal-Mogul Ignition Company, Southfield, MI (US)

( * ) Notice: Subject to any disclaimer, the term of this patent is extended or adjusted under 35 U.S.C. 154(b) by 62 days.

(21) Appl. No.: 13/025,237

(22) Filed: Feb. 11, 2011

(65) Prior Publication Data
US 2011/0273865 A1  Nov. 10, 2011

Related U.S. Application Data

(60) Provisional application No. 61/303,401, filed on Feb. 11, 2010.

(51) Int. Cl.
*F21V 7/10* (2006.01)
(52) U.S. Cl.
USPC ........... 362/511; 362/488; 362/559; 362/154; 362/101; 362/602; 248/311.2
(58) Field of Classification Search
USPC ......... 362/488, 511, 545, 559, 188, 154, 101, 362/602; 248/311.2
See application file for complete search history.

(56) References Cited

U.S. PATENT DOCUMENTS

| | | | | |
|---|---|---|---|---|
| 2,259,910 A | * | 10/1941 | Rylsky | 362/26 |
| 4,254,452 A | * | 3/1981 | Switala | 362/154 |
| 4,446,508 A | * | 5/1984 | Kinzie | 362/602 |
| 5,575,553 A | * | 11/1996 | Tipton | 362/101 |
| 5,711,595 A | * | 1/1998 | Gerbe | 362/84 |
| 5,915,832 A | | 6/1999 | Baird, Sr. | |
| 6,092,905 A | * | 7/2000 | Koehn | 362/101 |
| 6,234,439 B1 | | 5/2001 | Townsend et al. | |
| 6,637,709 B1 | | 10/2003 | Guenther et al. | |
| 6,896,387 B2 | * | 5/2005 | Renfro | 362/602 |
| 7,766,293 B2 | * | 8/2010 | Seidl et al. | 248/311.2 |
| 2007/0247836 A1 | | 10/2007 | Seidl et al. | |
| 2008/0186697 A1 | * | 8/2008 | Camarota et al. | 362/101 |
| 2008/0204268 A1 | | 8/2008 | Dowling et al. | |
| 2008/0266853 A1 | * | 10/2008 | Goto | 362/240 |
| 2009/0175049 A1 | * | 7/2009 | Lota | 362/488 |
| 2011/0261579 A1 | * | 10/2011 | Anderson et al. | 362/551 |

FOREIGN PATENT DOCUMENTS

| | | |
|---|---|---|
| DE | 20016019 U1 | 12/2000 |
| DE | 202005004257 | 5/2005 |
| DE | 102005056305 A1 | 6/2007 |
| DE | 102006026741 A1 | 12/2007 |
| JP | 2003182439 | 7/2003 |
| JP | 2005088608 | 4/2005 |
| JP | 2006069356 | 3/2006 |
| JP | 2006130955 | 5/2006 |

\* cited by examiner

*Primary Examiner* — Ismael Negron
(74) *Attorney, Agent, or Firm* — Robert L. Stearns; Dickinson Wright, PLLC

(57) ABSTRACT

The cup receptacle has an annular outer wall configured to receive a cup and a light source operably attached to the cup receptacle. The outer wall of the cup receptacle is constructed of a light transmitting material that is uniformly illuminated by light emitted from the light source.

14 Claims, 1 Drawing Sheet

ILLUMINATED MONOLITHIC CUP HOLDER ASSEMBLY AND METHOD

CROSS-REFERENCE TO RELATED APPLICATION

This application claims the benefit of U.S. Provisional Application Ser. No. 61/303,401, filed Feb. 11, 2010, which is incorporated herein by reference in its entirety.

BACKGROUND OF THE INVENTION

1. Technical Field

This invention relates generally to cup holders, and more particularly to vehicle cup holders illuminated with distributed light.

2. Related Art

Vehicle cup holders are typically located near the driver and passenger seats in a location convenient to reach. During daylight, the cup holders are easy to locate visually, and thus, there is no generally no problem placing the cup in the holder. However, during darkness, the cup holder can prove difficult to see, and thus, placing the cup in the holder can prove challenging.

In an effort to remedy the problem of locating a cup holder during darkness, lights have been disposed in the cup holder to illuminate it, thereby making it easier to see. The lights have been provided as light pipes, sometimes referred to as wave guides, to allow light to be distributed to discrete locations of the cup holder from a remote light source. Typically, the light pipe is a separate component disposed in the cup holder, and thus, the component cost and manufacturing cost are increased.

SUMMARY OF THE INVENTION

An illuminated vehicle cup holder assembly constructed in accordance with one aspect of the invention facilitates the ability to see a cup receptacle of the assembly in darkness while also providing an aesthetically pleasing, uniformly illuminated cup receptacle. The cup receptacle has an annular outer wall configured to receive a cup and a light source operably attached to the cup receptacle. The outer wall of the cup receptacle is constructed of a light transmitting material that is uniformly illuminated by light emitted from the light source.

In accordance with another aspect of the invention, the cup receptacle has a bottom attached to the annular outer wall, wherein the bottom is constructed of a light transmitting material such that light emitted from the light source uniformly illuminates the entirety of the outer wall and the bottom.

In accordance with yet another aspect of the invention, the light source is provided as a light emitting diode attached to a circuit board.

In accordance with yet another aspect of the invention, a method of constructing an illuminatable vehicle cup holder assembly is provided. The method includes providing a cup receptacle constructed of light transmitting material, with the cup receptacle being configured for assembly in a vehicle, and attaching a light emitting source directly to the cup receptacle.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
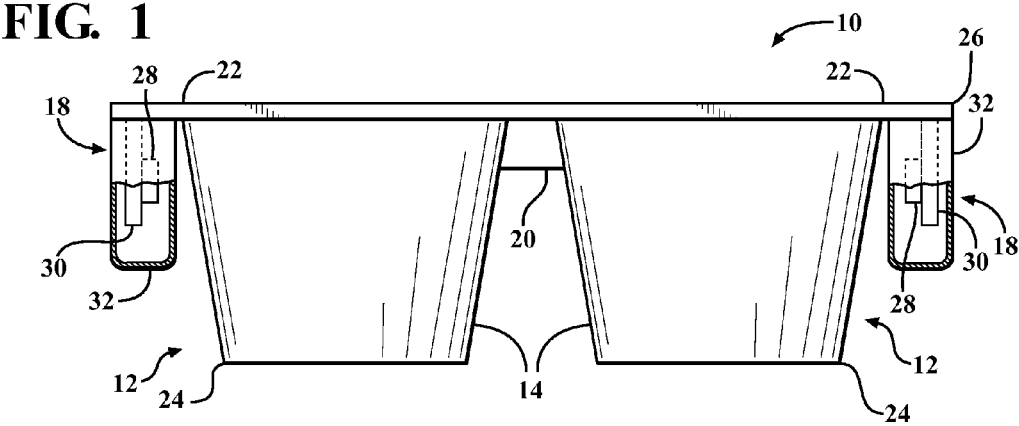
FIG. 1 is a side elevation view of a vehicle cup holder assembly constructed in accordance with one aspect of the invention.

Referring in more detail to the drawings, FIG. 1 illustrates a vehicle cup holder assembly, referred to hereafter as assembly 10, constructed in accordance with one aspect of the invention. The assembly 10 includes at least one, and shown here, by way of example and without limitation, as a pair of side-by-side cup receptacles 12, each having an annular outer wall 14 configured to receive and support a cup (not shown) with a bottom 16 configured to provide a stop surface for the cup to rest on, depending on the size and shape of the cup. The outer walls are constructed of a light transmitting material that uniformly transmits light emitted from a light source in "glowing" fashion, wherein the light source is represented here as a separate light source 18 operably attached to each outer wall 14.

The pair of cup receptacles 12 are shown in the drawings, by way of example and without limitation, as being formed as a single, monolithic piece of light transmitting material, e.g. a translucent material, such as white polycarbonate, for example. As such, the cup receptacles 12 are interconnected by an intermediate light transmitting polycarbonate bridge section 20. It should be recognized that the assembly 10 could be constructed having a single cup receptacle or a plurality of cup receptacles, and thus, the invention is not limited to the dual cup receptacle embodiment illustrated. Each cup receptacle 12 has an upper end 22 and a lower end 24 with a bottom 16 being formed at the lower end 24 as a monolithic piece of material with the respective outer wall 14 to support a bottom of the cup. As such, the bottom 16 is also constructed from the light transmitting polycarbonate material. The cup receptacles 12 are shown being generally frustroconical in shape, though other shapes are contemplated to be within the scope of the invention, such as cylindrical, for example. The upper end 22 has a planar surface, also referred to as flange 26, extending about its outer periphery, with the flange 26 being shown as extending radially outwardly from the cup receptacles 12 and having a generally rectangular outer periphery, for example.

Figure 2:
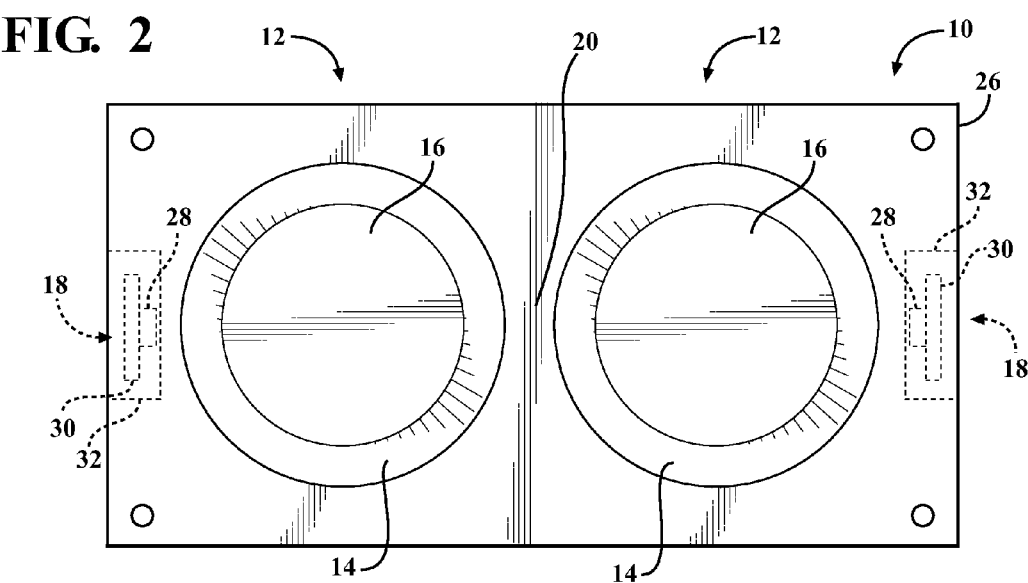
FIG. 2 is a partially broken away plan view of the vehicle cup holder assembly of FIG. 1.
Figure 3:
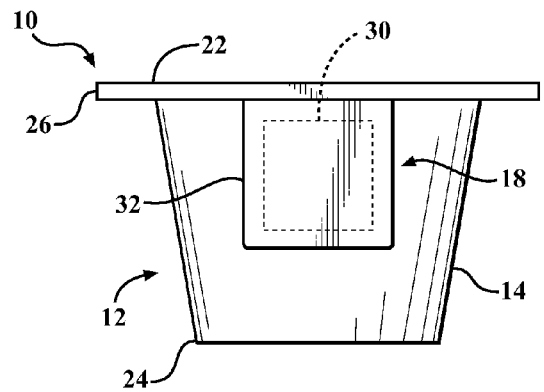
FIG. 3 is an end elevation view of the vehicle cup holder assembly of FIG. 1.

Each light source 18, as shown in FIGS. 1-3, for example, includes a light emitter 28, e.g. LED (provided to emit light of any desired wavelength), mounted to a circuit board 30, wherein the circuit board 30 is configured in electrical communication with a power source (not shown), e.g. vehicle battery. The circuit board 30, with light emitter 28 electrically attached thereto, is mounted within a light transmitting mounting portion 32 depending from the flange 26. The light transmitting mounting portion 32 can be constructed separately, or as a single monolithic piece of material with the flange 26 and receptacles 12. The light emitter 28 is positioned within the light transmitting mounting portion 32 such that the light emitted from each light emitter 28 is transmitted through the light transmitting portion 32 uniformly through the flange 26 and uniformly through the receptacles 12 and the bottoms 16.

As such, in use, the light transmitted from the light emitters 28 travels completely and uniformly throughout the outer walls 14 and the bottoms 16, wherein the light provides the entirety of the inside portions of the cup receptacles 12, including the outer walls 14 and bottoms 16, with a uniformly illuminated, glowing appearance for clear, aesthetic observance by the viewer.

Obviously, many modifications and variations of the present invention are possible in light of the above teachings. It is, therefore, to be understood that within the scope of the appended claims, the invention may be practiced otherwise than as specifically described.

What is claimed is:

1. An illuminatable vehicle cup holder assembly, comprising:
    at least one cup receptacle having an annular outer wall configured to receive a cup and having a bottom surface configured to support the cup;
    a light source;
    said annular wall and said bottom surface of said at least one cup receptacle being constructed of a light transmitting material that is uniformly illuminatable by said light source;
    further including a flange that extends outwardly from said annular wall and a mounting portion that depends from said flange with said flange and said mounting portion being formed as one piece of said light transmitting material with said annular wall and said bottom surface, said mounting portion being spaced radially outwardly from said annular wall; and
    wherein said light source is disposed within said mounting portion such that light from said light source is transferred through said mounting portion, uniformly through said flange, and uniformly through said annular wall and said bottom surface of said at least one cup receptacle.

2. The illuminatable vehicle cup holder assembly of claim 1 wherein said at least one cup receptacle includes a plurality of cup receptacles interconnected to one another by a light transmitting bridge section.

3. The illuminatable vehicle cup holder assembly of claim 2 wherein said plurality of cup receptacles and said bridge section are a monolithic piece of said light transmitting material.

4. The illuminatable vehicle cup holder assembly of claim 1 wherein said at least one cup receptacle is a monolithic piece of white polycarbonate.

5. The illuminatable vehicle cup holder assembly of claim 4 wherein said mounting portion is a light transmitting mounting portion.

6. The illuminatable vehicle cup holder assembly of claim 5 further comprising a circuit board mounted with said light transmitting mounting portion.

7. The illuminatable vehicle cup holder assembly of claim 6 wherein said light source is mounted to said circuit board.

8. A method of constructing an illuminatable vehicle cup holder assembly, comprising:
    providing at least one cup holder receptacle having an annular wall and a bottom surface configured to support a cup and being constructed of light transmitting material;
    providing a flange that extends outwardly from the annular wall and a mounting portion that depends from the flange and is spaced radially outwardly from the radial wall with the flange and mounting portion being formed as one piece of the light transmitting material with the annular wall and the bottom surface; and
    positioning a light source within the mounting portion to transfer light from the light source through the mounting portion to uniformly illuminate the flange and the annular wall and the bottom surface of the at least one cup holder receptacle.

9. The method of claim 8 further including providing the at least one cup receptacle having a plurality of cup receptacles interconnected to one another by a light transmitting bridge section.

10. The method of claim 9 further including forming the plurality of cup receptacles and the bridge section as a monolithic piece of the light transmitting material.

11. The method of claim 8 further including forming the at least one cup receptacle as a monolithic piece of white polycarbonate.

12. The method of claim 11 wherein the mounting portion is a light transmitting mounting portion.

13. The method of claim 12 further comprising mounting a circuit board with the light transmitting mounting portion.

14. The method of claim 13 further including mounting the light emitting source to the circuit board.

* * * * *